(12) United States Patent
Gottin et al.

(10) Patent No.: US 11,620,201 B2
(45) Date of Patent: Apr. 4, 2023

(54) SYSTEM AND METHOD FOR MANAGING A STORAGE SYSTEM USING A PERFORMANCE INDEX STRUCTURE

(71) Applicant: EMC IP Holding Company LLC, Hopkinton, MA (US)

(72) Inventors: Vinicius Michel Gottin, Rio de Janeiro (BR); Jaumir Valenca Da Silveira Junior, Rio de Janeiro (BR)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/460,507

(22) Filed: Aug. 30, 2021

(65) Prior Publication Data
US 2023/0068216 A1 Mar. 2, 2023

(51) Int. Cl.
*G06F 11/00* (2006.01)
*G06F 11/30* (2006.01)
*G06F 11/34* (2006.01)

(52) U.S. Cl.
CPC ...... *G06F 11/3034* (2013.01); *G06F 11/3075* (2013.01); *G06F 11/3409* (2013.01); *G06F 11/3466* (2013.01)

(58) Field of Classification Search
CPC ............ G06F 11/3447; G06F 11/3419; G06F 11/3409; G06F 11/3034; G06F 11/3452
See application file for complete search history.

(56) References Cited

U.S. PATENT DOCUMENTS

| 2013/0185729 | A1* | 7/2013 | Vasic | G06F 9/5072 718/104 |
| 2020/0034429 | A1* | 1/2020 | Shukla | G06N 3/08 |
| 2021/0224102 | A1* | 7/2021 | Desikachari | G06F 9/463 |

* cited by examiner

*Primary Examiner* — Charles Ehne
(74) *Attorney, Agent, or Firm* — Chamberlain, Hrdlicka, White, Williams & Aughtry

(57) ABSTRACT

A method for managing a storage system includes monitoring the storage system to obtain a set of input/output (I/O) telemetry entries, determine a workload signature based on the set of I/O telemetry entries, obtaining, based on the workload signature, a set of performance metrics, performing a parameter analysis to determine a set of alternative storage system parameterizations, based on the set of alternative storage system parameterization, generating a set of alternative performance metrics, updating a performance index structure based on the performance metrics, and the set of alternative performance metrics to obtain an updated performance index structure, and initiating a storage system update based on the updated performance index structure.

20 Claims, 5 Drawing Sheets

SYSTEM AND METHOD FOR MANAGING A STORAGE SYSTEM USING A PERFORMANCE INDEX STRUCTURE

BACKGROUND

Computing devices may include any number of internal components such as processors, memory, and persistent storage. Each of the internal components of a computing device may be used to generate data. The process of generating, storing, and backing-up data may utilize computing resources of the computing devices such as processing, storage, and network use. The utilization of the aforementioned computing resources to generate data may impact the overall performance of the computing resources.

SUMMARY

In general, certain embodiments described herein relate to a method for managing a storage system. The method includes monitoring the storage system to obtain a set of input/output (I/O) telemetry entries, determine a workload signature based on the set of I/O telemetry entries, obtaining, based on the workload signature, a set of performance metrics, performing a parameter analysis to determine a set of alternative storage system parameterizations, based on the set of alternative storage system parameterization, generating a set of alternative performance metrics, updating a performance index structure based on the performance metrics and the set of alternative performance metrics to obtain an updated performance index structure, and initiating a storage system update based on the updated performance index structure.

In general, certain embodiments described herein relate to a non-transitory computer readable medium that includes computer readable program code, which when executed by a computer processor enables the computer processor to perform a method for managing storage systems. The method includes monitoring the storage system to obtain a set of input/output (I/O) telemetry entries, determine a workload signature based on the set of I/O telemetry entries, obtaining, based on the workload signature, a set of performance metrics, performing a parameter analysis to determine a set of alternative storage system parameterizations, based on the set of alternative storage system parameterization, generating a set of alternative performance metrics, updating a performance index structure based on the performance metrics and the set of alternative performance metrics to obtain an updated performance index structure, and initiating a storage system update based on the updated performance index structure.

In general, certain embodiments described herein relate to a system for managing a storage system. The system includes a processor and memory that includes instructions, which when executed by the processor, perform a method. The method includes monitoring the storage system to obtain a set of input/output (I/O) telemetry entries, determine a workload signature based on the set of I/O telemetry entries, obtaining, based on the workload signature, a set of performance metrics, performing a parameter analysis to determine a set of alternative storage system parameterizations, based on the set of alternative storage system parameterization, generating a set of alternative performance metrics, updating a performance index structure based on the performance metrics and the set of alternative performance metrics to obtain an updated performance index structure, and initiating a storage system update based on the updated performance index structure.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
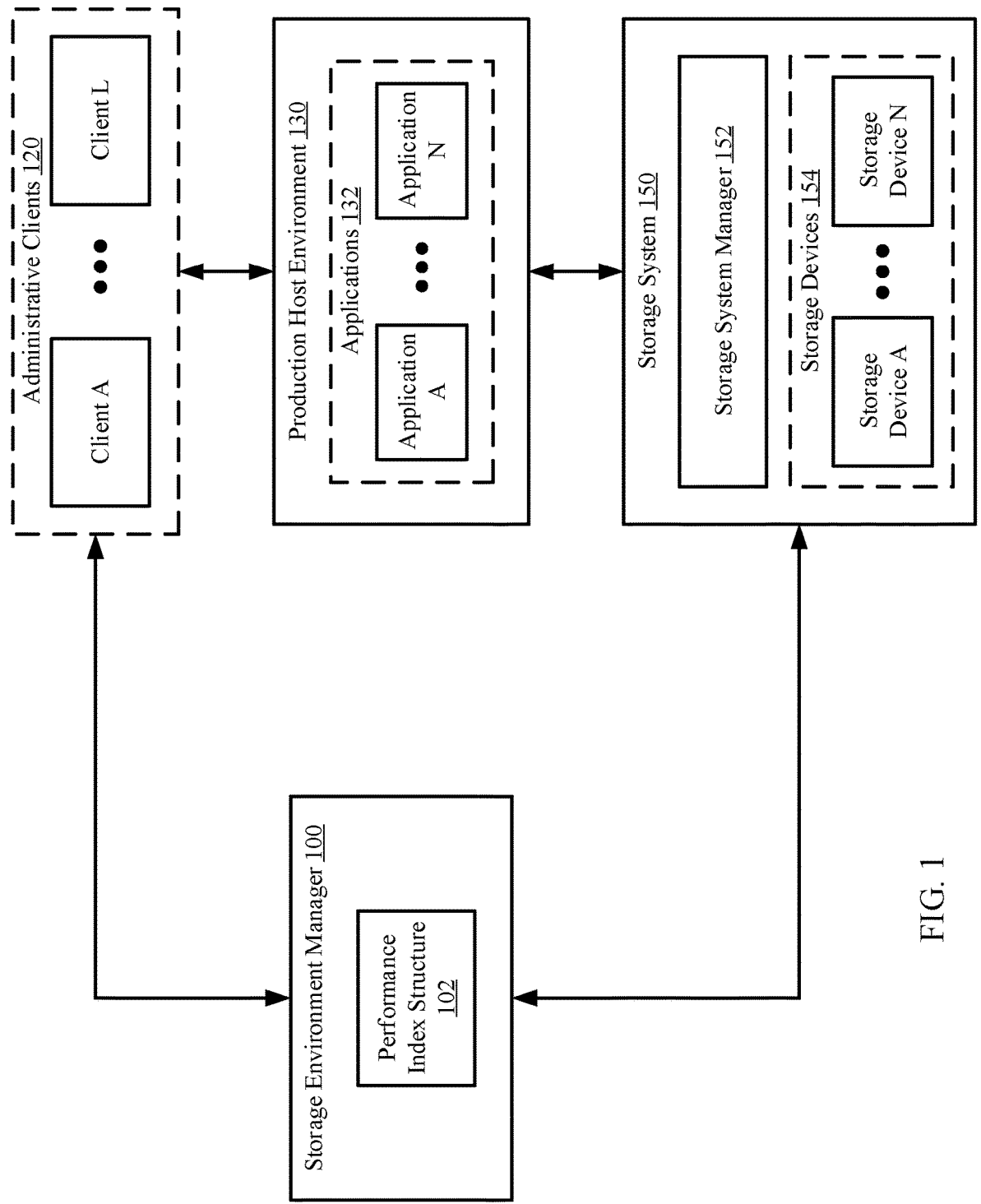
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art, that one or more embodiments of the present invention may be practiced without these specific details, and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to a method and system for managing a storage system. Specifically, embodiments of the invention relate to monitoring the activity performed on the storage system. The activity may be monitored by obtaining input/output (I/O) telemetry entries, obtained by the storage system, from applications using the storage system. The I/O telemetry entries may be used to determine a workload signature. Further, a storage system parameterization of the storage system may be obtained based on a configuration of the storage system during the performance of the activity.

The storage system parameterization and the workload signature may be used to obtain performance metrics related to the storage system. The performance metrics may be obtained from the storage system monitoring the performance metrics. Alternatively, the performance metrics may be predicted using a performance prediction model that is applied to the workload signature, and storage system parameterization to obtain an output. Such output may include, for example, estimated performance metrics.

Further, the storage system parameterization may be used to identify alternative storage system parameterizations that may be similar to the storage system parameterization. Each of the alternative storage system parameterizations may be applied to the performance prediction model to obtain a set of performance metrics, each corresponding to the respective alternative storage system parameterization and workload signature.

The relationship between each alternative storage system parameterization, workload signature, and respective performance metrics may be stored in a performance index structure. The performance index structure may further relate the workload signature and original storage system parameterization to the original performance metrics. The performance index structure may be updated based on the aforementioned relationships following the generation, and/or obtaining of the performance metrics.

Following the update of the performance index structure, a storage system update may be initiated. The storage system update may be initiated by communicating with an administrative client to provide the storage system parameterization and corresponding performance metrics to the administrative client, and obtaining a response that includes a selection of a storage system parameterization. The selection may be based on an optimization of the performance metrics. In one or more embodiments, the storage system update further includes reconfiguring the storage system in accordance with the selected storage system parameterization.

FIG. 1 shows an example system in accordance with one or more embodiments of the invention. The system includes a storage environment manager (100), one or more administrative clients (120), a production host environment (130), a storage system (150). The system may include additional, fewer, and/or different components without departing from the invention. Each component may be operably connected to any of the other components via any combination of wired and/or wireless connections. Each component illustrated in FIG. 1 is discussed below.

In one or more embodiments of the invention, the storage environment manager (100) manages the operation of the storage system (150). Specifically, the storage environment manager (100) manages the storage system (150) by obtaining I/O telemetry entries corresponding to the use of the storage system (150), and based on the I/O telemetry entries, initiating update of the storage system (150) to operate in a more optimal manner.

In one or more embodiments of the invention, the storage environment manager (100) includes a performance index structure (102). The performance index structure (102) may include performance entries that each relate performance metrics of the storage system (150) to a workload signature and a storage system parameterization. For additional details regarding the performance index structure (102) and/or the contents of the performance entries, see, e.g., FIG. 2.

While the system of FIG. 1 is illustrated as only including one storage system (150), the storage environment manager (100) may manage the operation of any number of storage systems without departing from the invention.

Figure 5:
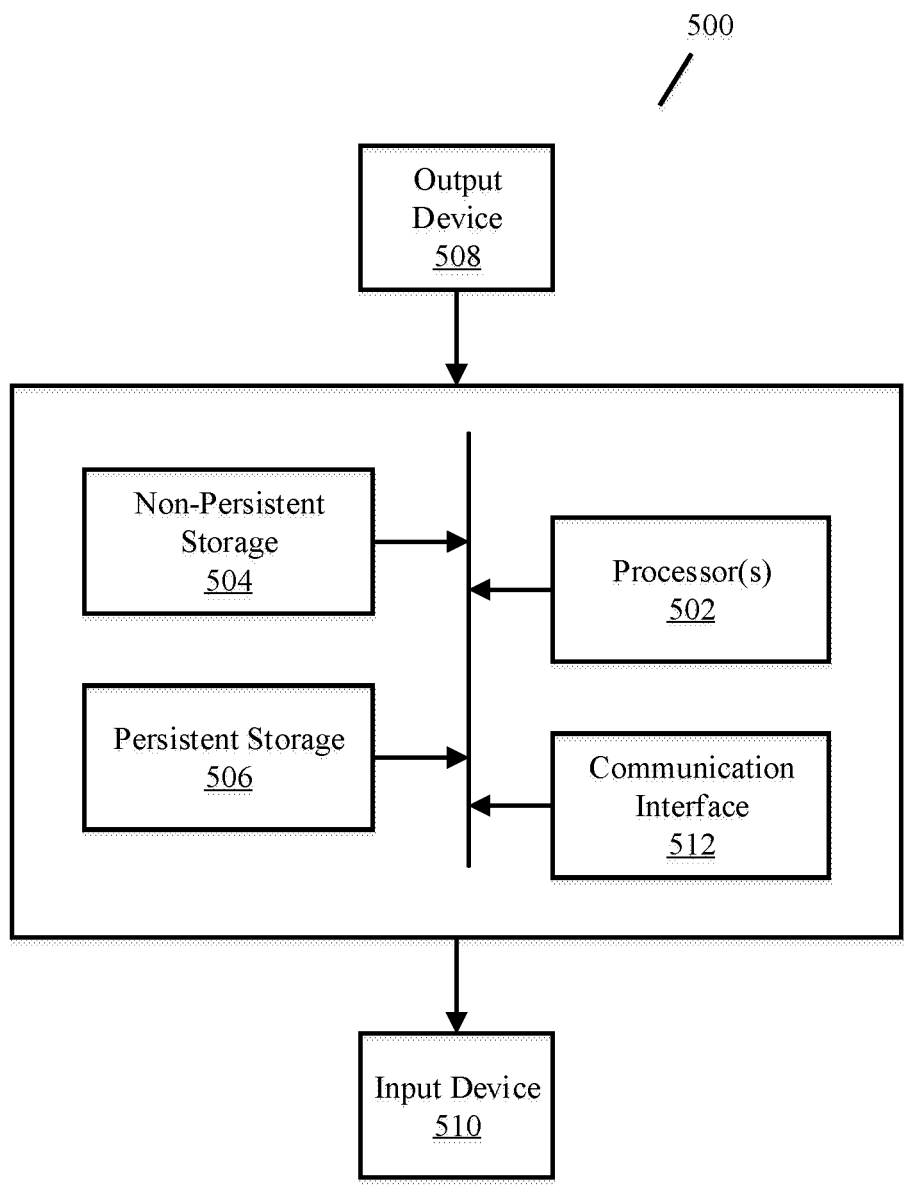
FIG. 5 shows a diagram of a computing device in accordance with one or more embodiments of the invention.

In one or more embodiments of the invention, the storage environment manager (100) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of the storage environment manager (100) described throughout this application and/or all, or a portion thereof, of the methods illustrated in FIG. 3, and described below.

In one or more embodiments of the invention, the storage environment manager (100) is implemented as a logical device. The logical device may utilize the hardware computing resources of any number of computing devices, and thereby provide the functionality of the storage environment manager (100) described throughout this application and/or all, or a portion thereof, of the methods illustrated in FIG. 3.

In one or more embodiments of the invention, the administrative clients (120) utilize the services of the production host environment (130). Specifically, the administrative clients (120) utilize the services of the applications (132) that may result in the storage and/or otherwise usage of the storage system (150).

In one or more embodiments of the invention, the administrative clients (120) communicate with the storage environment manager (100) to initiate configuration of the storage system (150). The administrative clients (120) may be operated by administrators (e.g., users) that manage the configuration of the storage system (150). The communication may be performed in accordance with FIG. 3.

In one or more embodiments of the invention, the administrative clients (120) are each implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of the administrative clients (120) described throughout this application.

In one or more embodiments of the invention, an administrative client (120) is implemented as a logical device. The logical device may utilize the hardware computing resources of any number of computing devices and thereby provide the functionality of the administrative clients (120) described throughout this application.

In one or more embodiments of the invention, the production host environment (130) hosts applications (132). The applications (132) may be logical entities executed using computing resources (not shown) of the production host environment (130). Each of the applications may be performing similar or different processes. In one or more embodiments of the invention, the applications (132) provide services to users, e.g., clients (not shown). For example, the applications (132) may host components. The components may be, for example, instances of databases, email servers, and/or other components. The applications (132) may host other types of components without departing from the invention. The performance of the applications (132) may include the use of the storage system (150) to store data, read stored data, and/or otherwise access the storage system (150).

In one or more of embodiments of the invention, the applications (132) are implemented as computer instructions, e.g., computer code, stored on a persistent storage (e.g., 150) that when executed by a processor(s) of the production host environment (130) cause the production host environment (130) to provide the functionality of the applications (132) described throughout this application.

In one or more embodiments of the invention, the production host environment (130) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device, cause the computing device to perform the functionality of the production host environment (130) described throughout this application.

In one or more embodiments of the invention, the production host environment (130) is implemented as a logical device. The logical device may utilize the hardware computing resources of any number of computing devices and thereby provide the functionality of the production host environment (130) described throughout this application.

In one or more embodiments of the invention, the storage system (150) stores data. The data may be generated by and/or stored from the production environment (130). The storage system (150) may utilize storage devices (154) to store the data. Any number of storage devices (154) may be used to store the data. The storage devices (154) may be configured in any manner for utilization of storage.

For example, the storage devices (154) may be organized in any combination of storage layers. The storage layers may be based on their proximity and/or access to the processors executing the storage of the data. Higher-level storage layers may relate to characteristics such as, for example, being more proximate to the processors, being used first for data storage, having less available data to store, and being more volatile.

Continuing the above example, as more data is generated and stored in the storage system (150), storage policies may be implemented to move data from one storage layer to other layers. For example, the storage policy may specify a threshold of available data that, when reached by the storage layer, initiates a transfer of the data from a volatile storage layer to a persistent storage layer. Other storage policies may be implemented without departing from the invention.

In one or more embodiments of the invention, the storage system (150) includes a storage system manager (152). The storage system manager (152) may manage the storage devices (154) by monitoring the incoming write requests and read requests issued to the storage devices (154), sending I/O telemetry entries to the storage environment manager (100). Further, the storage system manager (152) may include functionality for monitoring the performance metrics of the storage system (150). Such performance metrics may be further provided to the storage environment manager (100) to be processed in accordance with FIG. 3.

In one or more embodiments of the invention, the storage system (150) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device, cause the computing device to perform the functionality of the storage system (150) described throughout this application.

In one or more embodiments of the invention, the storage system (150) is implemented as a logical device. The logical device may utilize the hardware computing resources of any number of computing devices and thereby provide the functionality of the storage system (150) described throughout this application.

While FIG. 1 shows a configuration of components, other configurations may be used without departing from the scope of embodiments described herein. Accordingly, embodiments disclosed herein should not be limited to the configuration of components shown in FIG. 1.

Figure 2:
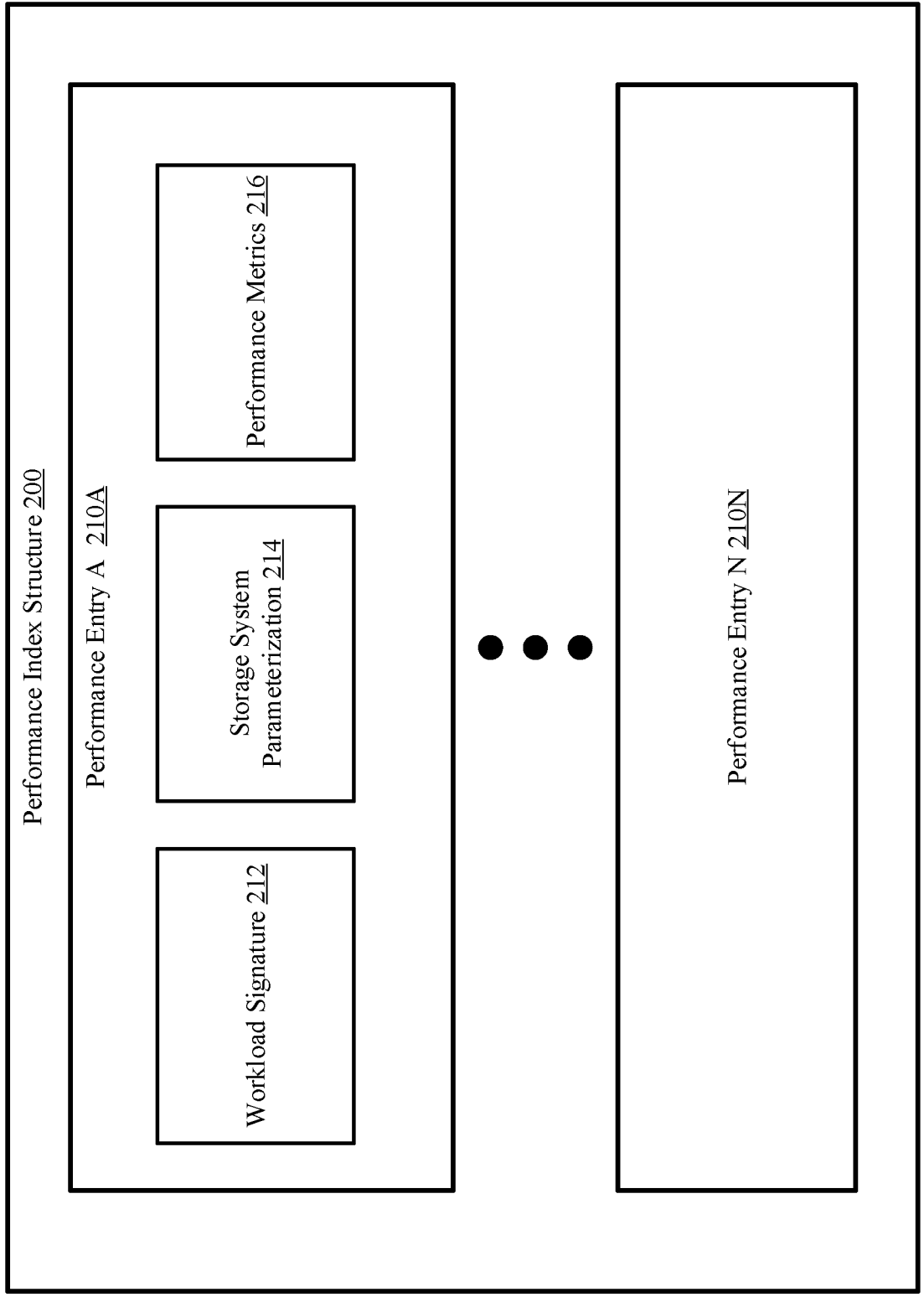
FIG. 2 shows a diagram of a production host in accordance with one or more embodiments of the invention.

FIG. 2 shows a diagram of a performance index structure (200) in accordance with one or more embodiments of the invention. The performance index structure (200) may be similar to the performance index structure (102, FIG. 1) discussed above. As discussed above, the performance index structure (200) may include performance entries (210A, 210N). The performance index structure (200) may include additional, fewer, and/or different data structures without departing from the invention. As discussed above, a performance entry (e.g., 210A) may relate a workload signature (212) and a storage system parameterization (214) to performance metrics (216). The performance entry (210A) may include additional data without departing from the invention. The aforementioned data structures of the performance entry (210A) are discussed below.

In one or more embodiments of the invention, the workload signature (212) is a data structure that characterizes the usage of the storage system based on obtained I/O telemetry entries. The workload signature (212) may be generated by analyzing the I/O telemetry entries to determine a workload profile of the workload. In one or more embodiments of the invention, a workload profile is a categorization of a workload. For example, a workload profile may relate to one of: high read-rate workload, a high write-rate workload, a combination of high read-rate and high write-rate workload, a high frequency of write requests, a high average size of data storage per write request, and/or a high total number of applications utilizing the storage system. Other categorizations of the workloads may be related in a workload profile without departing from the invention. The workload signature (212) may be generated in accordance with FIG. 3 (described below).

In one or more embodiments of the invention, the storage system parameterization (214) is a data structure that represents a collective set of parameters that are based on a configuration of the storage system. Examples of parameters include, but are not limited to: a storage layer flush interval, a promotion threshold, and a number of storage devices corresponding to each storage layer in the storage system.

The storage system parameterization (214) may be based on an existing storage system parameterization applied to a storage system. Alternatively, the storage system parameterization may be based on a storage system parameterization that can be altered from an existing storage system parameterization. The alteration may be, for example, a configuration of one of the set of parameters of the existing storage system parameterization.

In one or more embodiments of the invention, the performance metrics (216) include information that may be based on the application of a workload corresponding to the workload signature (212) on a storage system configured in accordance with the storage system parameterization (214). The performance metrics (216) may specify, for example, response times by the storage system to obtained read requests and/or write requests. Other examples of performance metrics (216) include, but are not limited to: consumption of power by the storage system and available storage at one or more points in time.

Figure 3:
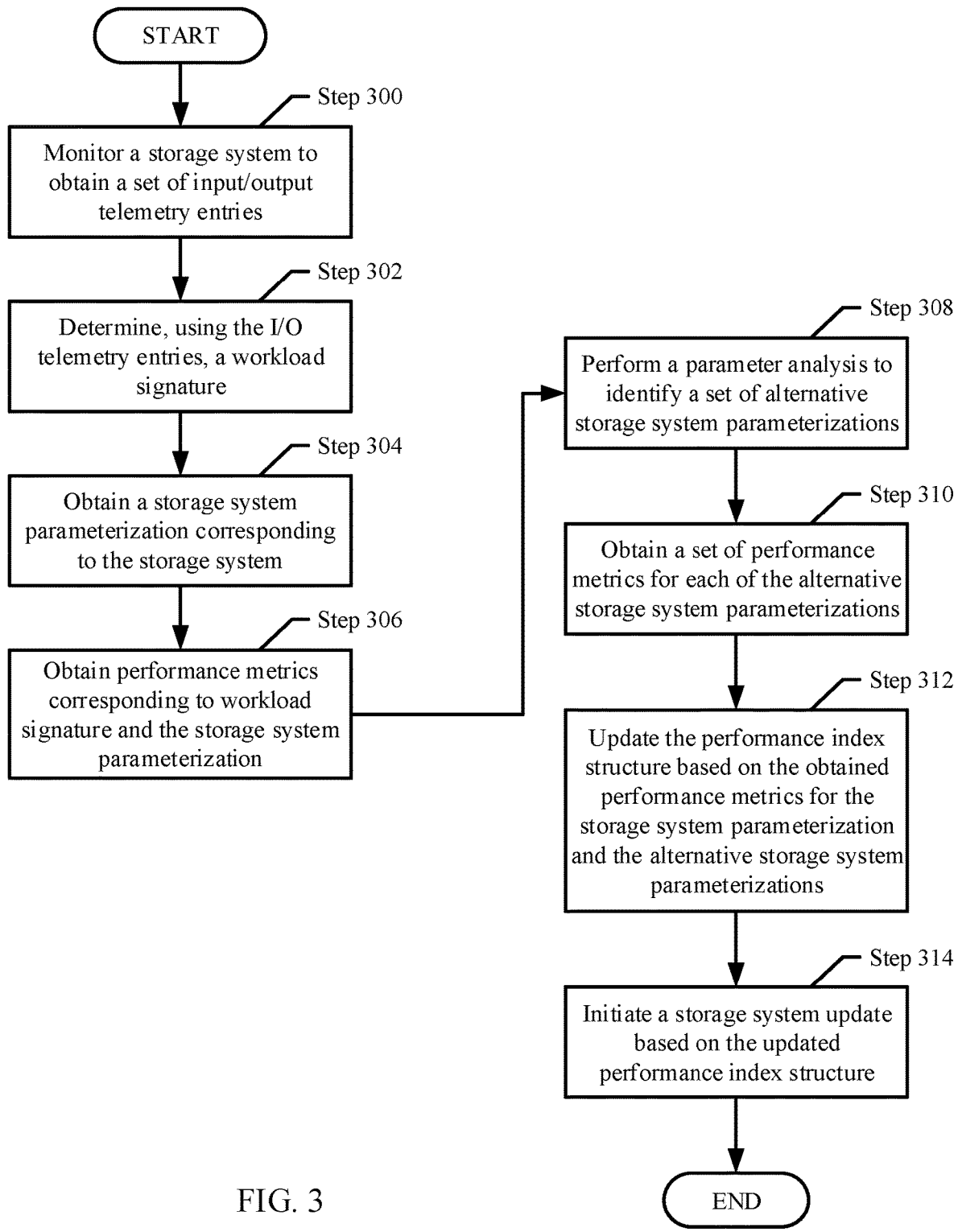
FIG. 3 shows a flowchart for managing a storage system in accordance with one or more embodiments of the invention.

FIG. 3 shows a flowchart in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIG. 3 may be performed in parallel with any other steps shown in FIG. 3 without departing from the scope of the invention.

FIG. 3 shows a flowchart for managing a storage system in accordance with one or more embodiments of the invention. The method shown in FIG. 3 may be performed by, for example, a production agent manager (150, FIG. 1). Other components of the system illustrated in FIG. 1 may perform the method of FIG. 3 without departing from the invention.

Turning to FIG. 3, in step 300, a storage system is monitored to obtain a set of I/O telemetry entries. In one or more embodiments of the invention, the monitoring is performed by prompting a storage system manager of the storage system to provide the I/O telemetry entries. The I/O telemetry entries may be provided, for example, periodically. Alternatively, the I/O telemetry entries may be provided on a per-request basis.

In step 302, a workload signature is determined using the I/O telemetry entries. In one or more embodiments of the invention, the workload signature is determined by analyzing the I/O telemetry entries to identify characteristics of the workload. The characteristics may specify, for example, the average size of the data requested in each read request, the average size of data to be written in each write request, a frequency of read requests, a frequency of write requests, and an average number of applications.

The workload signature may be determined by classifying the workload based on the identified classifications. The workload signature may specify the classification of the workload.

In step 304, a storage system parameterization is obtained corresponding to the storage system. In one or more embodiments of the invention, the storage system parameterization is obtained from the storage system manager. The storage system manager may store a data structure that stores a set of parameters implemented by the storage system. The storage system parameterization may be obtained via any other mechanism without departing from the invention. For the sake of clarity, throughout the discussion of FIG. 3, the storage system parameterization may be referred to as the original storage system parameterization.

In step 306, performance metrics corresponding to the workload signature and the original storage system parameterization are obtained. In one or more embodiments of the invention, the performance metrics are obtained from the storage system manager that measures the performance metrics on the storage system.

Alternatively, the performance metrics are obtained by applying a performance prediction model on the workload signature and the original storage system parameterization. In one or more embodiments of the invention, the performance prediction model is a machine learning algorithm that takes, as an input, a workload signature and a storage system parameterization and outputs performance metrics.

In step 308, a parameter analysis is performed on the original storage system parameterization to identify a set of alternative storage system parameterizations. In one or more embodiments of the invention, the parameter analysis includes determining, based on each parameter in the set of parameter corresponding to the original storage system parameterization, a potential modification to be performed on the parameter. The potential modification may include increasing or decreasing, to a varying degree, a value of the parameter. An alternative storage system parameterization may correspond to one or more potential modifications performed on the original storage system parameterization. Each alternative storage system parameterization in the set may correspond to a unique combination of potential modifications.

Further, the parameter analysis may include determining whether each alternative storage system parameterization is a plausible storage system parameterization. Such determination may be based on the combination of potential modifications. For example, a combination of potential modifications may result in a storage system parameterization that specifies conflicting parameters. In such scenario, the storage system parameterization may not be plausible. Such implausible storage system parameterizations may not be included in the set of alternative storage system parameterizations.

In one or more embodiments of the invention, the set of alternative storage system parameterizations are obtained from a set of existing and previously implemented storage system parameterizations and/or storage system parameterizations that have been implemented on other storage systems. In such scenario, the parameter analysis includes identifying a similarity of each previous storage system parameterization to the original storage system parameterization. The similarity may be determined based on a variance of the values of the parameters between the original storage system parameterization to each of the previous storage system parameterizations. Those storage system parameterizations related to low variances may be determined to be similar to the original storage system parameterization.

In step 310, a set of performance metrics are obtained for each of the alternative storage system parameterizations. In one or more embodiments of the invention, the performance metrics are generated by applying the performance prediction model to each alternative storage system parameterization using the workload signature.

In step 312, the performance index structure is updated based on the obtained performance metrics for the storage system parameterization and the set of alternative storage system parameterizations. In one or more embodiments of the invention, the performance index structure is updated by generating performance entries that each specify the workload signature, an alternative storage system parameterization, and corresponding performance metrics.

Further, the performance index structure is updated by determining whether the generating performance index structure previously included a performance entry that specifies the original storage system parameterization, the workload signature, and a first set of performance metrics. If such performance entry existed prior to performing step 312, the performance entry is updated with the obtained performance metrics. In such scenarios in which the performance entry did not previously exist, the update to the performance index structure includes generating such performance entry.

In step 314, a storage system update is initiated based on the updated performance index structure. In one or more embodiments of the invention, the storage system update includes reconfiguring the storage system in accordance with one of the alternative storage system parameterization.

Specifically, the storage environment manager may communicate with an administrative client that manages the operation of the storage system. The communication may include sending, by the storage environment manager, the performance index structure to the administrative client, and obtaining a response from the storage environment manager that specifies a selection of an alternative storage system parameterization. The selection may be based on the corresponding performance metrics being considered optimal compared to the other performance metrics.

In one or more embodiments of the invention, the storage system is updated by analyzing, by the storage environment manager, the performance index structure to determine an optimal storage system parameterization based on a comparison of the performance metrics for the workload signature. The storage environment manager may initiate a reconfiguration of the storage system in accordance with the determined optimal storage system parameterization.

In one or more embodiments of the invention, it may be determined that the original storage system parameterization is the optimal storage system parameterization. In such embodiments, the storage system may not be updated.

Example

Figure 4:
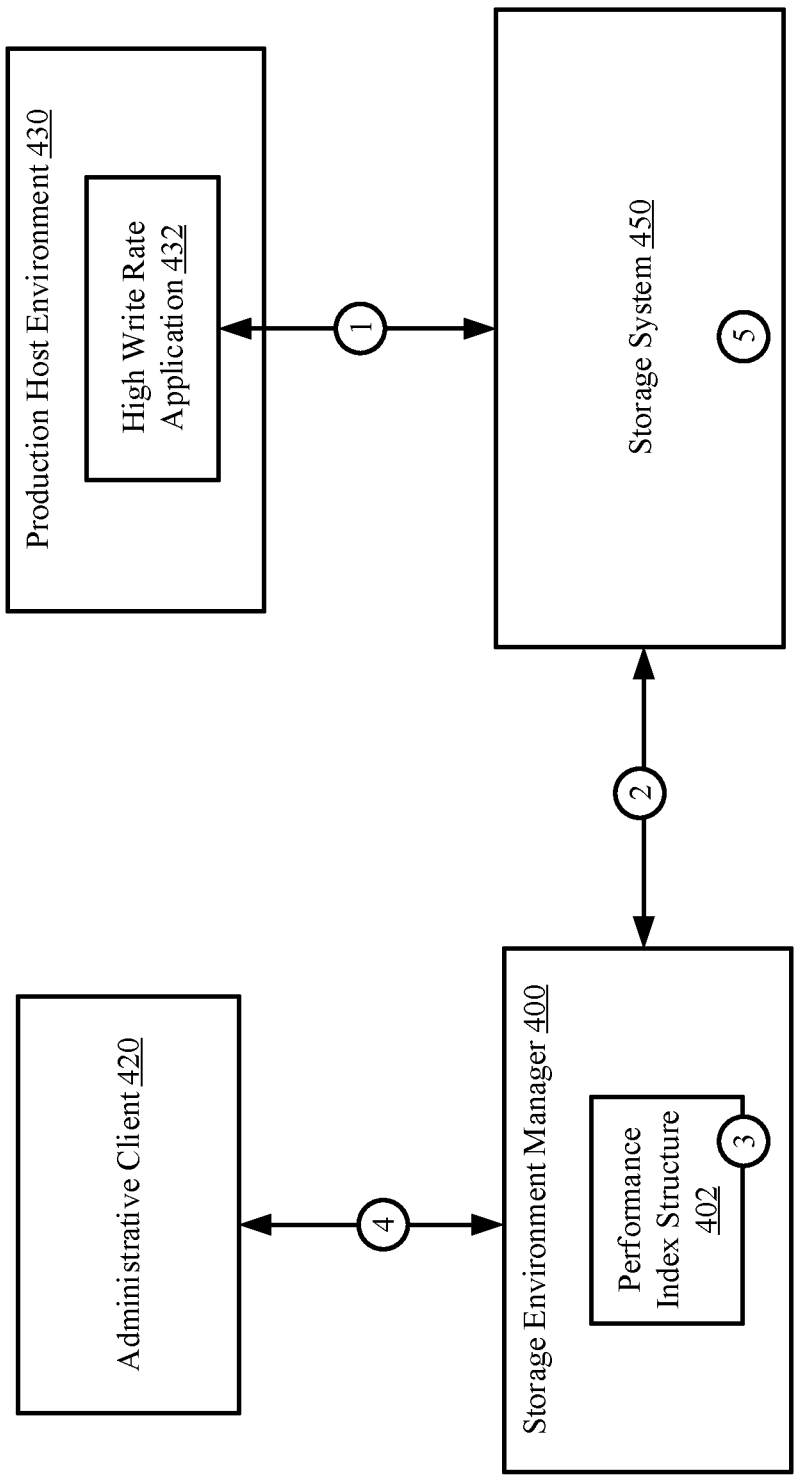
FIG. 4 shows an example in accordance with one or more embodiments of the invention.

The following section describes an example. The example is not intended to limit the invention. Turning to the example, consider a scenario in which a storage system is utilized to store data. FIG. 4 shows an example system including the storage system (450), a production host environment (430) that hosts a high write rate application (432), a storage environment manager (400), and an administrative client (420). For the sake of brevity, not all components of the example system may be illustrated in FIG. 4.

The high write rate application (432) utilizes the storage system (450) to store data [1]. During the utilization, a set of write requests are sent to the storage system (450) that specify writing data to be stored in the storage system. While not illustrated in FIG. 4, the storage system (450) is organized into tiers of cache. A higher tier cache level stores data with lower latency and with higher access. During the operation, the storage system (450) implements flushing policies that specify transferring data from the volatile higher tier cache level to a lower tier layer (a portion of such layers may store the data persistently) after a data threshold is reached in the higher tier cache level and after a period of time has elapsed without use of the data. During the utilization, write requests are sent to the storage system (450), and the storage system services the write requests while implementing the flushing policies.

A storage system manager (not shown) of the storage system (450) provides I/O telemetry entries to the storage environment manager (400) [2]. The I/O telemetry entries specify each read request and write request sent by the high write rate application (432), and any additional relevant information corresponding to the requests such as the high write rate application (432), the size of the data, a timestamp, and a number of storage devices used to service the request.

In response to obtaining the I/O telemetry entries, the storage environment manager (400) performs the method of FIG. 3 to update the performance index structure and initiate an update of the storage system (450) [3]. Specifically, the storage environment manager (400) generates a workload signature based on the I/O telemetry entries. The workload signature is generated by analyzing the I/O telemetry entries to identify a high number of write requests and a low frequency of read requests. Based on this identification, the workload signature is generated that relates the workload applied to the storage system (450) as a high write rate and a low read rate.

Continuing the method of FIG. 3, the storage environment manager (400) obtains a storage system parameterization corresponding to the storage system (450) during the operation. The storage system parameterization specifies the flushing policies implemented by the storage system (450). The workload signature and the storage system parameterization are applied to a performance prediction model to generate performance metrics. A performance entry is generated that specifies the workload signature, the storage system parameterization, and the performance metrics. The performance entry is stored in a performance index structure (402).

Further, based on the storage system parameterization, a set of alternative storage system parameterizations are generated, each relating to a potential modification of the storage system parameterization. The potential modifications include modifying the flushing policies such that the data threshold is increased in one alternative storage system parameterization, and decreased in a second alternative storage system parameterization. Additional potential modifications include modifying a period of time required to elapse before transferring data between layers. The period of time is reduced in a third alternative storage system parameterization and increased in a fourth alternative storage system parameterization. The workload signature and each of the alternative storage system parameterizations are applied to the performance prediction model to obtain a set of performance metrics. The performance index structure (402) is further updated with performance entries each relating the workload signature and an alternative storage system parameterization to corresponding performance metrics.

Following the update of the performance index structure (402), the storage environment manager (400) continues the method of FIG. 3 to communicate with the administrative client and obtain a selection of the alternative storage system parameterization [4]. The communication includes providing the set of alternative storage system parameterizations and the respective performance metrics to the administrative client with a request to select an alternative storage system parameterization. The administrative client (420) responds with its selection. In this example, the selection is the third alternative storage system parameterization.

Following the response, the storage environment manager (400) initiates updating the storage system (450) to modify the set of parameters implemented by the storage system (450) to be in accordance with the third alternative storage system parameterization. Specifically, the flushing policies are updated to indicate a lower period of time required after the data has been used by the high write rate application (432).

End of Example

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention may improve the efficiency of a storage system utilized by one or more applications by monitoring the workload applied to the storage system, and initiating a reconfiguration of the storage system to more optimally accommodate such workload. In this manner, the response time of the storage system servicing the workload may be improved. Such improvement may result in a higher efficiency of the overall system.

Thus, embodiments of the invention may address the problem of inefficient use of computing resources in a distributed computing environment. This problem arises due to the technological nature of the environment in which storage systems are utilized.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for managing a storage system, the method comprising:
    monitoring the storage system to obtain a set of input/output (I/O) telemetry entries;
    determine a workload signature based on the set of I/O telemetry entries;
    obtaining, based on the workload signature, a set of performance metrics;
    performing a parameter analysis to determine a set of alternative storage system parameterizations, wherein each of the set of alternative storage system parameterizations corresponds to a potential modification of one of a previous set of storage system parameterizations;
    based on the set of alternative storage system parameterization, generating a set of alternative performance metrics;
    updating a performance index structure based on the performance metrics and the set of alternative storage system parameterizations to obtain an updated performance index structure; and
    initiating a storage system update based on the updated performance index structure.

2. The method of claim 1, further comprising:
    before obtaining the performance metrics, obtaining a storage system parameterization corresponding to the storage system,
    wherein the performance metrics are further obtained based on the storage system parameterization.

3. The method of claim 2, wherein the updated performance index structure comprises a performance entry that specifies the workload signature, the storage system parameterization, and the performance metrics.

4. The method of claim 2, wherein performing the parameter analysis comprises:
    determining a similarity of each of the set of previous storage system parameterizations to the storage system parameterization; and
    determining the set of alternative storage system parameterizations based on the similarity of each of the set of previous storage system parameterizations to the storage system parameterization.

5. The method of claim 2, wherein the performance metrics are obtained by applying a performance prediction model to the storage system parameterization and the workload signature.

6. The method of claim 1, wherein the performance metrics are obtained from the storage system.

7. The method of claim 1, wherein initiating the storage system update comprises:
providing the performance index structure to an administrative client;
obtaining, from the administrative client, a selection of an alternative storage system prioritization; and
based on the selection, updating the storage system.

8. A system for managing a storage system, comprising:
a processor; and
memory comprising instructions, which when executed by the processor, perform a method, the method comprising:
monitoring the storage system to obtain a set of input/output (I/O) telemetry entries;
determine a workload signature based on the set of I/O telemetry entries;
obtaining, based on the workload signature, a set of performance metrics;
performing a parameter analysis to determine a set of alternative storage system parameterizations, wherein each of the set of alternative storage system parameterizations corresponds to a potential modification of one of a previous set of storage system parameterizations;
based on the set of alternative storage system parameterization, generating a set of alternative performance metrics;
updating a performance index structure based on the performance metrics and the set of alternative performance metrics to obtain an updated performance index structure; and
initiating a storage system update based on the updated performance index structure.

9. The system of claim 8, further comprising:
before obtaining the performance metrics, obtaining a storage system parameterization corresponding to the storage system,
wherein the performance metrics are further obtained based on the storage system parameterization.

10. The system of claim 9, wherein the updated performance index structure comprises a performance entry that specifies the workload signature, the storage system parameterization, and the performance metrics.

11. The system of claim 9, wherein performing the parameter analysis comprises:
determining a similarity of each of the set of previous storage system parameterizations to the storage system parameterization; and
determining the set of alternative storage system parameterizations based on the similarity of each of the set of previous storage system parameterizations to the storage system parameterization.

12. The system of claim 9, wherein the performance metrics are obtained by applying a performance prediction model to the storage system parameterization and the workload signature.

13. The system of claim 8, wherein the performance metrics are obtained from the storage system.

14. The system of claim 8, wherein initiating the storage system update comprises:
providing the performance index structure to an administrative client;
obtaining, from the administrative client, a selection of an alternative storage system prioritization; and
based on the selection, updating the storage system.

15. A non-transitory computer readable medium comprising computer readable program code, which when executed by a computer processor enables the computer processor to perform a method, the method comprising:
monitoring the storage system to obtain a set of input/output (I/O) telemetry entries;
determine a workload signature based on the set of I/O telemetry entries;
obtaining, based on the workload signature, a set of performance metrics;
performing a parameter analysis to determine a set of alternative storage system parameterizations, wherein each of the set of alternative storage system parameterizations corresponds to a potential modification of one of a previous set of storage system parameterizations;
based on the set of alternative storage system parameterizations, generating a set of alternative performance metrics;
updating a performance index structure based on the performance metrics and the set of alternative performance metrics to obtain an updated performance index structure; and
initiating a storage system update based on the updated performance index structure.

16. The non-transitory computer readable medium of claim 8, further comprising:
before obtaining the performance metrics, obtaining a storage system parameterization corresponding to the storage system,
wherein the performance metrics are further obtained based on the storage system parameterization.

17. The non-transitory computer readable medium of claim 16, wherein the updated performance index structure comprises a performance entry that specifies the workload signature, the storage system parameterization, and the performance metrics.

18. The non-transitory computer readable medium of claim 16, wherein performing the parameter analysis comprises:
determining a similarity of each of the set of previous storage system parameterizations to the storage system parameterization; and
determining the set of alternative storage system parameterizations based on the similarity of each of the set of previous storage system parameterizations to the storage system parameterization.

19. The non-transitory computer readable medium of claim 16, wherein the performance metrics are obtained by applying a performance prediction model to the storage system parameterization and the workload signature.

20. The non-transitory computer readable medium of claim 15, wherein initiating the storage system update comprises:
providing the performance index structure to an administrative client;
obtaining, from the administrative client, a selection of an alternative storage system prioritization; and
based on the selection, updating the storage system.

* * * * *